United States Patent
Contreras et al.

(10) Patent No.: US 11,560,738 B2
(45) Date of Patent: Jan. 24, 2023

(54) DOOR LOCK ASSEMBLY FOR A VEHICLE DOOR PANEL

(71) Applicants: Nissan North America, Inc., Franklin, TN (US); NISSAN MOTOR CO., LTD., Yokohama (JP)

(72) Inventors: Edgar Montes de Oca Contreras, Toluca (MX); Yosuke Nakai, Atsugi (JP)

(73) Assignee: NISSAN NORTH AMERICA, INC., Franklin, TN (US)

(*) Notice: Subject to any disclaimer, the term of this patent is extended or adjusted under 35 U.S.C. 154(b) by 852 days.

(21) Appl. No.: 16/457,374

(22) Filed: Jun. 28, 2019

(65) Prior Publication Data

US 2020/0408004 A1    Dec. 31, 2020

(51) Int. Cl.
  *E05B 77/04* (2014.01)
  *B60J 5/04* (2006.01)
  *E05B 77/36* (2014.01)

(52) U.S. Cl.
  CPC ............. *E05B 77/04* (2013.01); *B60J 5/0456* (2013.01); *E05B 77/36* (2013.01)

(58) Field of Classification Search
  CPC .......... E05B 77/04; E05B 77/36; B60J 5/0456
  See application file for complete search history.

(56) References Cited

U.S. PATENT DOCUMENTS

| | | | |
|---|---|---|---|
| 7,648,192 B2 | 1/2010 | Herline et al. | |
| 8,414,038 B2 | 4/2013 | Bedekar et al. | |
| 8,727,399 B2* | 5/2014 | Russell | E05B 77/06 292/216 |
| 8,955,257 B2* | 2/2015 | Moriya | B60J 5/042 49/502 |
| 2011/0115251 A1* | 5/2011 | Jordan | E05B 77/04 292/336.3 |
| 2018/0363336 A1* | 12/2018 | Weber | E05B 85/16 |

FOREIGN PATENT DOCUMENTS

| | | | | |
|---|---|---|---|---|
| CN | 104895423 A | * | 9/2015 | ............. E05B 77/38 |
| FR | 3006631 A1 | * | 12/2014 | ............. B60J 5/0451 |
| FR | 3053990 A1 | * | 1/2018 | ............. E05B 77/40 |

* cited by examiner

*Primary Examiner* — Kristina R Fulton
*Assistant Examiner* — James E Ignaczewski
(74) *Attorney, Agent, or Firm* — Global IP Counselors, LLP

(57) ABSTRACT

A door lock assembly for a vehicle door includes a door panel, a stiffener bracket, a lock assembly, and a door pad. The door panel includes an inner door panel and an outer door panel. A stiffener bracket is connected to the inner door panel. A lock assembly is connected to the inner door panel. A door pad is connected to the stiffener bracket. The door pad is configured to interfere with the lock assembly to prevent the lock assembly from unlocking the vehicle door upon an object impacting the outer door panel.

15 Claims, 15 Drawing Sheets

DOOR LOCK ASSEMBLY FOR A VEHICLE DOOR PANEL

BACKGROUND

Field of the Invention

The present invention generally relates to a door lock assembly for a vehicle door panel. More specifically, the present invention relates to a door lock assembly for a vehicle door panel in which a lock lever of the door lock assembly is prevented from moving to an unlocked position upon an object impacting the door panel.

Background Information

Vehicle structures often include a structural feature that accommodates an impact force generated during an impact event.

SUMMARY

An object of the disclosure is to provide a door lock assembly for a vehicle door panel in which a lock lever of a lock assembly is prevented from moving to an unlocked position upon an object impacting the vehicle door panel.

In view of the state of the known technology, one aspect of the present disclosure is to provide a door lock assembly for a vehicle door panel. The door lock assembly includes a door panel, a stiffener bracket, a lock assembly, and a door pad. The door panel includes an inner door panel and an outer door panel. A stiffener bracket is connected to the inner door panel. A lock assembly is connected to the inner door panel. A door pad is connected to the stiffener bracket. The door pad is configured to interfere with the lock assembly to prevent the lock assembly from moving to an unlocked position upon an object impacting the outer door panel.

Also other objects, features, aspects and advantages of the disclosed door lock assembly for a vehicle door panel will become apparent to those skilled in the art from the following detailed description, which, taken in conjunction with the annexed drawings, discloses exemplary embodiments of the door lock assembly for a vehicle door panel.

BRIEF DESCRIPTION OF THE DRAWINGS

Referring now to the attached drawings which form a part of this original disclosure.

DETAILED DESCRIPTION OF EXEMPLARY EMBODIMENTS

Selected embodiments will now be explained with reference to the drawings. It will be apparent to those skilled in the art from this disclosure that the following descriptions of the exemplary embodiments are provided for illustration only and not for the purpose of limiting the invention as defined by the appended claims and their equivalents.

Figure 1:
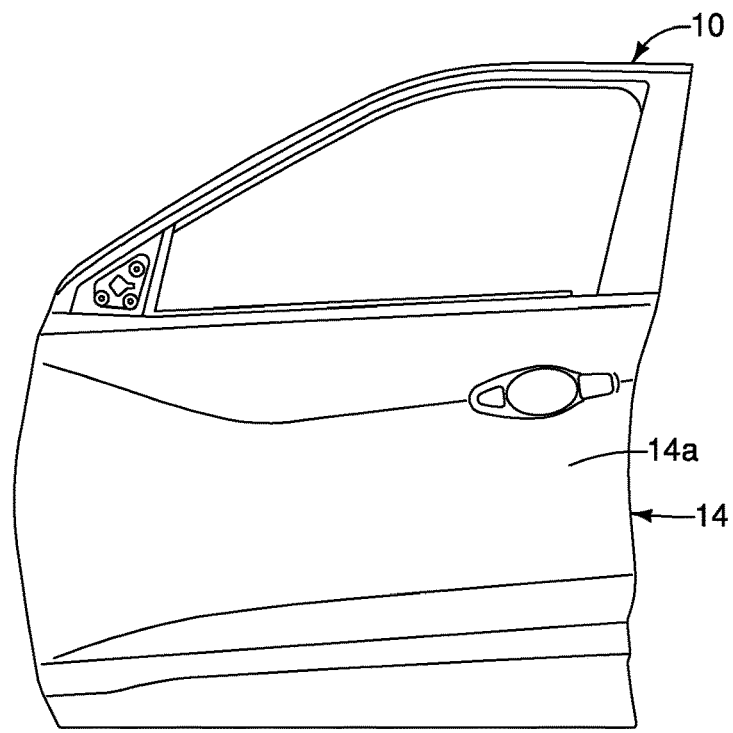
FIG. 1 is a side elevational view of a door panel for a vehicle.

Referring initially to FIG. 1, a vehicle door panel 10 is illustrated in accordance with exemplary embodiments of the present invention. The vehicle door panel 10 is a front door panel shown removed from a vehicle. For the sake of brevity, only one vehicle door panel 10 is described herein below. However, the description below of features of the vehicle door panel 10 applies equally to both front and rear door panels of a vehicle. The vehicle may be any suitable vehicle, such as a sedan or sport utility vehicle (SUV).

Figure 2:
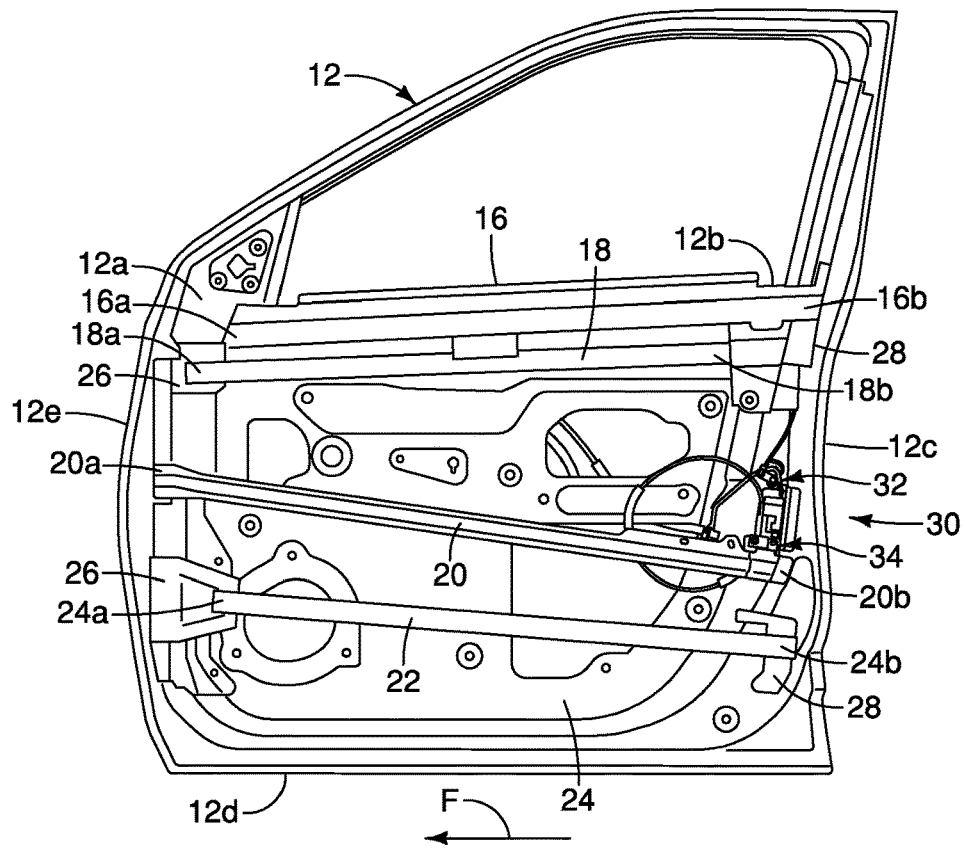
FIG. 2 is a side elevational view of the door panel of FIG. 1 in which an outer door panel is removed in accordance with a first exemplary embodiment of the present invention.

As shown in FIGS. 1-2, the vehicle door panel 10 includes an inner door panel, or inner panel, 12, an outer door panel, or outer panel, 14, and a plurality of reinforcement, or stiffener, brackets 16, 18, 20 and 22. The plurality of reinforcement brackets include a first stiffener bracket 16 extending substantially in a longitudinal direction of the vehicle, a second stiffener bracket 18 extending substantially in the longitudinal of the vehicle, a third stiffener bracket 20 extending substantially in the longitudinal direction of the vehicle, and a fourth stiffener bracket 22 extending substantially in the longitudinal of the vehicle. Each of the first, second, third and fourth stiffener brackets 16, 18, 20 and 22 is connected to the inner door panel 12. Preferably, each of the first, second, third and fourth stiffener brackets 16, 18, 20 and 22 is made of metal, such as steel, although any suitable material can be used. The inner door panel 12 is shown with four stiffener brackets connected thereto, although any suitable number of stiffener brackets can be used.

As shown in FIG. 2, the inner door panel 12 has an outboard surface 12a and an inboard surface (not shown). The outer door panel 14, as shown in FIG. 1, has an outboard surface 14a and an inboard surface (not shown). The inner door panel 12 defines a hollow recessed area or cavity 24 that is concealed with the outer door panel 14 attached to the inner door panel 12 and the vehicle door panel 10 fully assembled. The cavity 24 is defined by the space between the outboard surface 12a of the inner door panel 12 and an inboard surface of the outer door panel 14. The inner door panel 12 and the outer door panel 14 are connected to one another in a conventional manner, such as by welding or with an adhesive. For example, an outer periphery of the inner door panel 12 can be fixed to a corresponding outer periphery of the outer door panel 14 via any of a variety of welding techniques or adhesives.

A rearward edge 12c of the inner door panel 12 extends downward from a rear end of the upper edge 12b to a bottom edge 12d, as shown in FIG. 2. The bottom edge 12d is generally straight and extends horizontally (with the vehicle being level) from a lower end of the rearward edge 12c to a lower edge of a forward edge 12e. The forward edge 12e extends upward from a front end of the bottom edge 12d to a forward end of the upper edge 12b.

The first stiffener bracket 16 has a forward, or first, end 16a and a rearward, or second, end 16b, as shown in FIG. 2. The forward and rearward ends 16a and 16b, each of which preferably includes an attachment flange, are rigidly attached to the inner door panel 12 via, for example, one of a variety of conventional welding techniques or mechanical fasteners. The first stiffener bracket 16 is a longitudinally extending bracket within the cavity 24 that extends along the upper edge 12b of the inner door panel 12. The forward end 16a is fixed proximate to the forward edge 12e of the inner door panel 12. The rearward end 16b of the first stiffener bracket 16 is fixed to the inner door panel 12 at a longitudinal position proximate to the rearward edge 12c.

The second stiffener bracket 18 is preferably a tubular member, as shown in FIG. 2. Alternatively, the second stiffener bracket 18 can be a ribbed member similar to the first and third stiffener brackets 16 and 20. The second stiffener bracket 18 has a forward, or first, end 18a and a rearward, or second, end 18b, as shown in FIG. 2. The forward and rearward ends 18a and 18b of the second stiffener bracket 18 are preferably fixed to the inner door panel 12 by attachment flanges 26 and 28, respectively. The second stiffener bracket 18 is a longitudinally extending bracket within the cavity 24 that extends below the first stiffener bracket 16. The forward end 18a is fixed proximate to the forward edge 12e of the inner door panel 12. The rearward end 18b of the second stiffener bracket 16 is fixed to the inner door panel 12 at a longitudinal position proximate to the rearward edge 12c. The second stiffener bracket 18 is disposed lower than the first stiffener bracket 16.

The third stiffener bracket 20 has an upper, or first, end 20a and a lower, or second, end 20b. The upper end 20a, which preferably includes an upper attachment flange, is rigidly attached to the inner door panel 12 adjacent to the forward edge 12e via, for example one of a variety of conventional welding techniques or mechanical fasteners. The lower end 20b, which preferably includes an attachment flange, is rigidly attached to the inner door panel 12 adjacent to the rearward edge 12c via, for example, any one of a variety of conventional welding techniques or mechanical fasteners. The third stiffener bracket 20 is an upwardly extending bracket within the cavity 24 that extends upwardly from proximate the rearward edge 12c of the inner door panel 12 to proximate the forward edge 12e of the inner door panel 12. In other words, the third stiffener bracket 20 extends upwardly in a forward direction F of the vehicle, as shown in FIG. 2. The third stiffener bracket 20 is angularly inclined relative to the horizontal. The third stiffener bracket 20 is disposed lower than the second stiffener bracket 18. The third stiffener bracket 20 accommodates forces associated with a side impact on the outer door panel 14 of the vehicle door panel 10.

The fourth stiffener bracket 22 is preferably a tubular member, as shown in FIG. 2. Alternatively, the fourth stiffener bracket 22 can be a ribbed member similar to the first and third stiffener brackets 16 and 20. A forward, or upper, end 22a of the fourth stiffener bracket 22 is fixed proximate the forward edge 12e of the inner door panel 12 via an attachment flange 26. A rearward, or lower, end 22b of the fourth stiffener bracket 22 is fixed to the rearward edge 12c of the inner door panel 12 via an attachment flange 28. The fourth stiffener bracket 22 is an upwardly extending bracket within the cavity 24 that extends upwardly from proximate the rearward edge 12c of the inner door panel 12 to proximate the forward edge 12e of the inner door panel 12. In other words, the fourth stiffener bracket 22 extends upwardly in a forward direction F of the vehicle, as shown in FIG. 2. The fourth stiffener bracket 22 is angularly inclined relative to the horizontal. The fourth stiffener bracket 22 is disposed lower than the third stiffener bracket 22. The fourth stiffener bracket 22 preferably has a smaller incline than the third stiffener bracket 20.

A door lock assembly 30 in accordance with a first exemplary embodiment of the present invention is shown in FIGS. 2-8. The door lock assembly 30 includes the door panel 10, the third stiffener bracket 20, a lock assembly 32 and a door pad 34.

Figure 3:
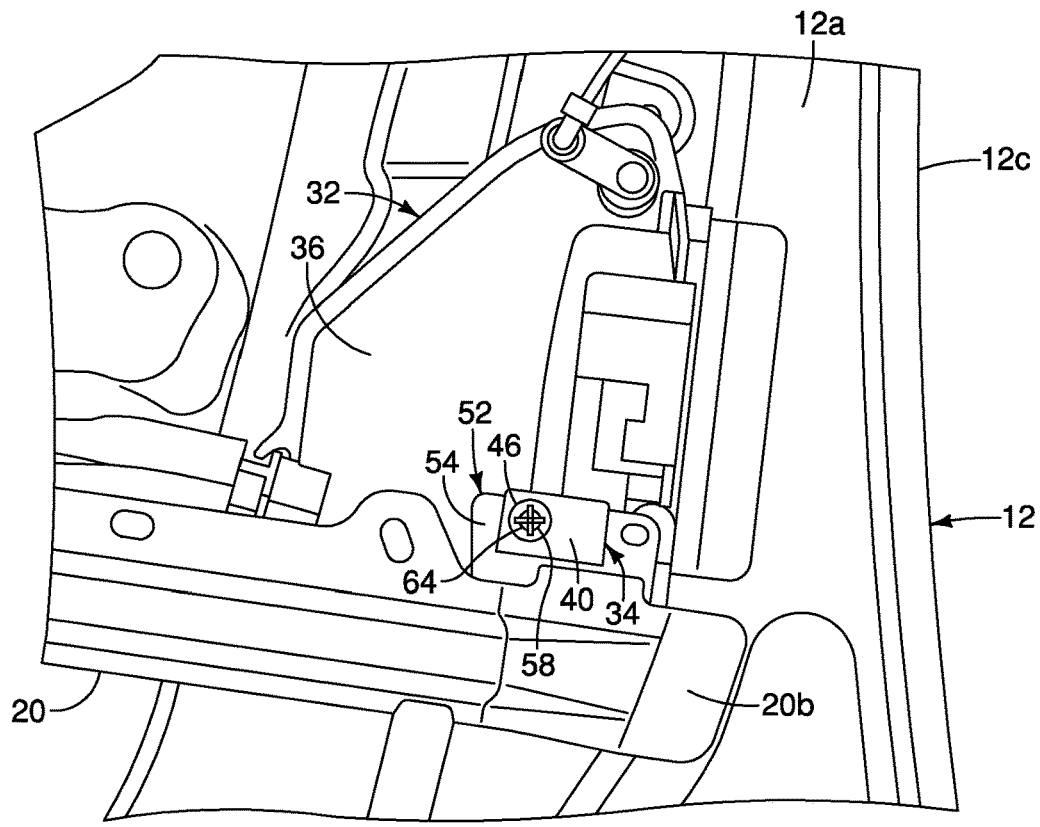
FIG. 3 is an enlarged side elevational view of the inner door panel of FIG. 2 in which a door pad is connected to a stiffening bracket.

As shown in FIGS. 2 and 3, the third stiffener bracket 20 is connected to the inner door panel 12. The lock assembly 32 is connected to the inner door panel 12, as shown in FIGS. 2 and 3. An inboard facing portion of the third stiffener bracket 20 contacts the lock assembly 32 to further secure the lock assembly 32 to the inner door panel 12.

Figure 5:
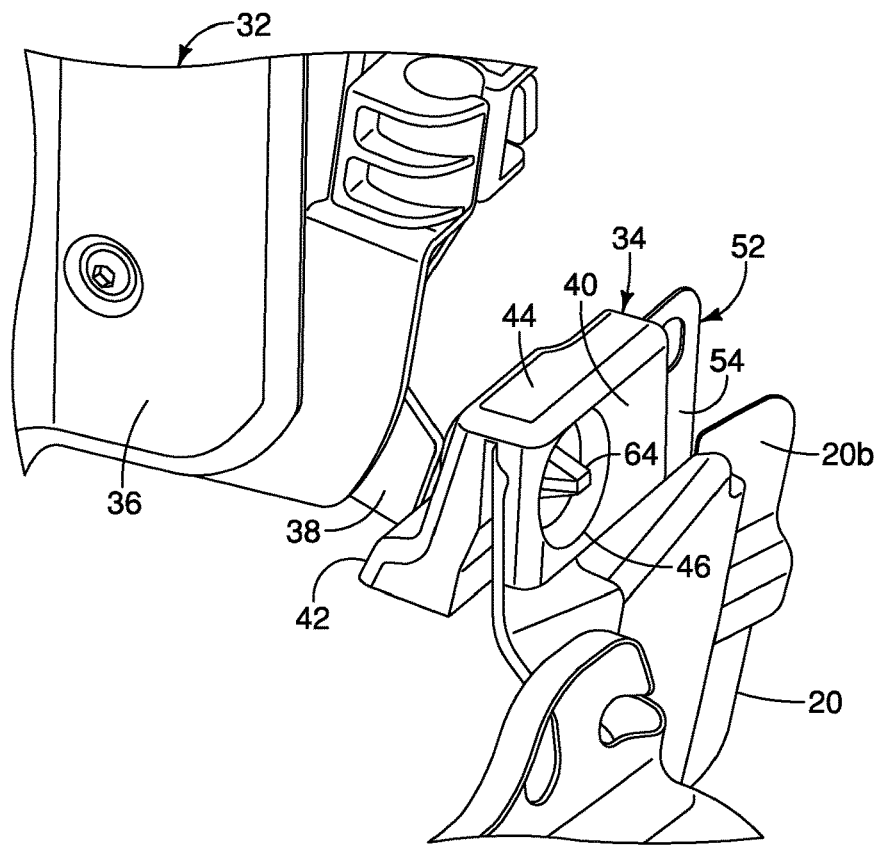
FIG. 5 is an inboard perspective view of the door pad in a non-interference position with respect to a lock lever of a lock assembly.
Figure 6:
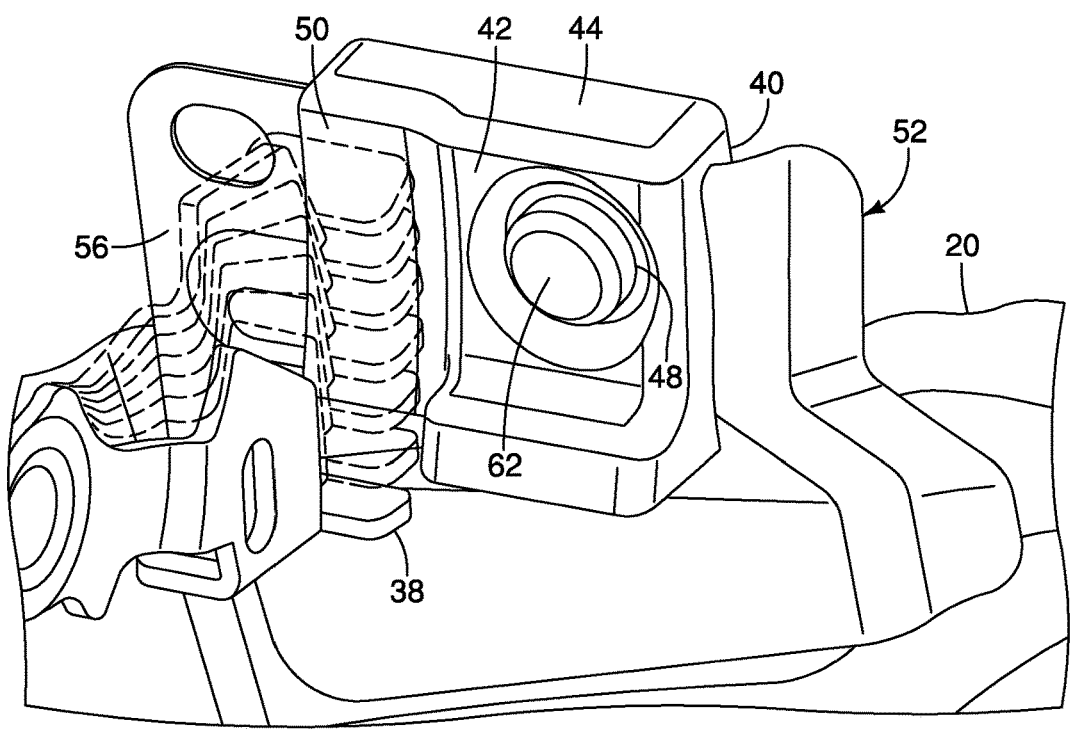
FIG. 6 is an outboard perspective view of the door pad in a non-interference position with respect to the lock lever of the lock assembly.
Figure 7:
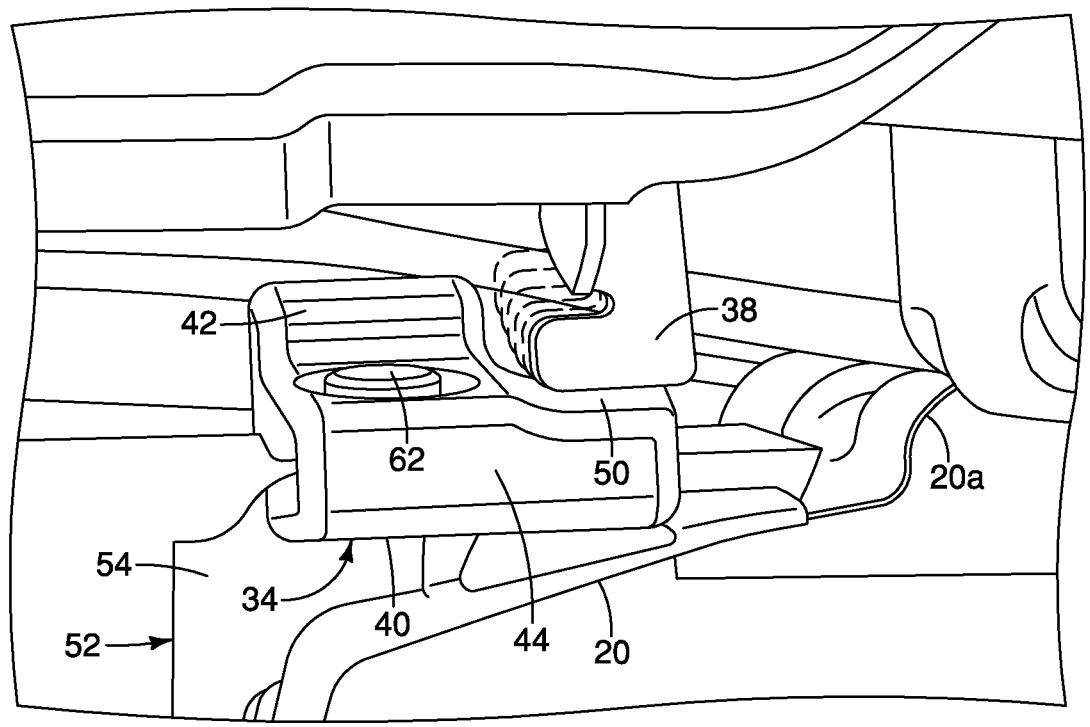
FIG. 7 is a top plan view of the door pad of FIG. 5 in the non-interference position.

The door lock assembly 30 includes a base 36 connected to the inner door panel 12 and a lock lever 38 (FIGS. 5 and 6) movable relative to the base 36. Movement of the lever 38 results in movement of a door latch member to engage or disengage a striker connected to a structural pillar of the vehicle. The door latch member and the striker are conventional structures and detailed descriptions thereof are omitted for the sake of brevity. As shown in FIGS. 5 and 6, the lever 38 is in a locked position in which the door latch member is engaged with the striker to prevent opening of the vehicle door panel 10. Upward movement of the lever 38 results in the door latch member disengaging the striker, such that the vehicle door panel 10 can be opened. A lowermost position of the lever 38 corresponds to the locked position as shown in FIGS. 5 and 6, and an uppermost position of the lever 38 corresponds to the unlocked position as shown in FIG. 7.

The door pad 34 is connected to the third stiffener bracket 20, as shown in FIGS. 2-8. The door pad 34 includes an outboard, or first, portion 40, an inboard, or second, portion 42 and a connecting portion 44. The connecting portion 42 connects the outboard portion 40 and the inboard portion 42. The outboard portion 40 faces in an outboard direction of the vehicle, and the inboard portion 42 faces in an inboard direction of the vehicle. A first fastener opening 46 is disposed in the outboard portion 40 of the door pad 34. A third fastener opening 48 is disposed in the inboard portion 42 of the door pad 34.

Figure 4:
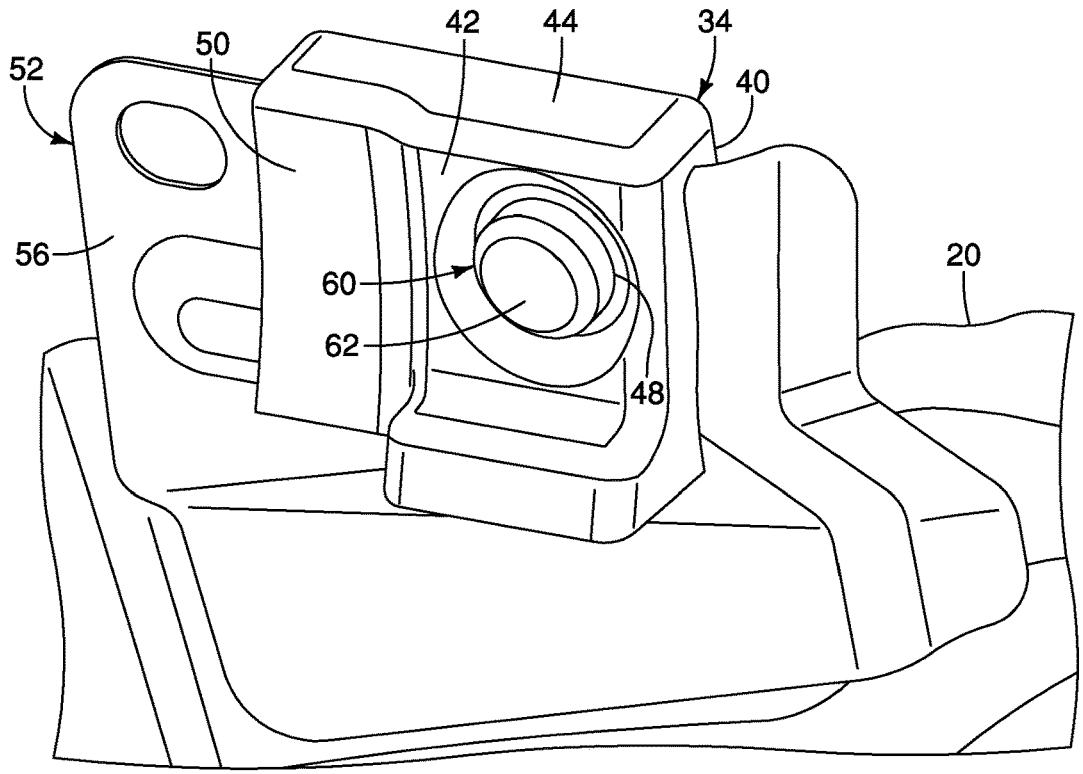
FIG. 4 is a perspective view of the door pad and stiffening bracket of FIG. 3 prior to mounting to the inner door panel.

As shown in FIGS. 4 and 6, the inboard portion 42 of the door pad 34 has a recessed surface 50 to allow movement of the lever 38 between the locked and unlocked positions. The recessed surface 50 preferably extends the entire length of the door pad 34 from a lower end of the inboard portion 42 to an upper end thereof. The width of the recessed surface is preferably less than an entire width of the inboard portion 42. More preferably, the width of the recessed surface 50 is less than approximately half of the width of the inboard portion 42. The third fastener opening 48 is spaced from the recessed surface 50 to avoid interfering with movement of the lever 38.

The door pad 34 is preferably a unitary, one-piece member. Preferably, the door pad 34 is made of an expanded polypropylene (EPP) foam, although any suitable material can be used.

A mounting bracket 52 is connected to the third stiffener bracket 20, as shown in FIGS. 2-8. The mounting bracket 52 can be connected to the third stiffener bracket 20 in any suitable manner, such as by spot welding. The mounting bracket 52 has an outboard surface 54 and an inboard surface 56. A second fastener opening 58 extends from the outboard surface 54 to the inboard surface 56 of the mounting bracket 52. Preferably, the mounting bracket 52 is made of metal, such as steel, although any suitable material can be used.

A mounting clip 60 secures the door pad 34 to the mounting bracket 52. The mounting clip 60 has a head 62 disposed at one end and a retaining clip 64 disposed at an opposite end thereof. The mounting clip 60 is passed through the third fastener opening 48 in the inboard portion 42 of the door pad 34, through the second fastener opening 58 in the mounting bracket 52 and through the first fastener opening 46 in the outboard portion 40 to secure the door pad 34 to the mounting bracket 52. The retaining clip 64 is preferably a pair of flexible arms that flex inwardly to pass through the plurality of fastener openings, and then flex outwardly to prevent removal of the inserted mounting clip 60. As shown in FIGS. 2-8, the mounting clip 60 is inserted in the outboard direction, although the mounting clip 60 can be inserted in the inboard direction. The width of the head 62 of the mounting clip 60 is larger than a diameter of the second fastener opening 48 in the inboard portion 42 to limit the insertion depth of the mounting clip 60. The width of the retaining clip 64 is larger than a diameter of the first fastener opening 46 in the outboard portion 40 of the door pad 34 to prevent removal of the inserted mounting clip 60. Although the mounting clip 60 preferably engages the mounting bracket 52 and both the outboard and inboard portions 40 and 42 of the door pad 34, the mounting clip 60 can be engaged with the mounting bracket 52 and only one of the inboard and outboard portions 40 and 42 of the door pad 34.

Figure 8:
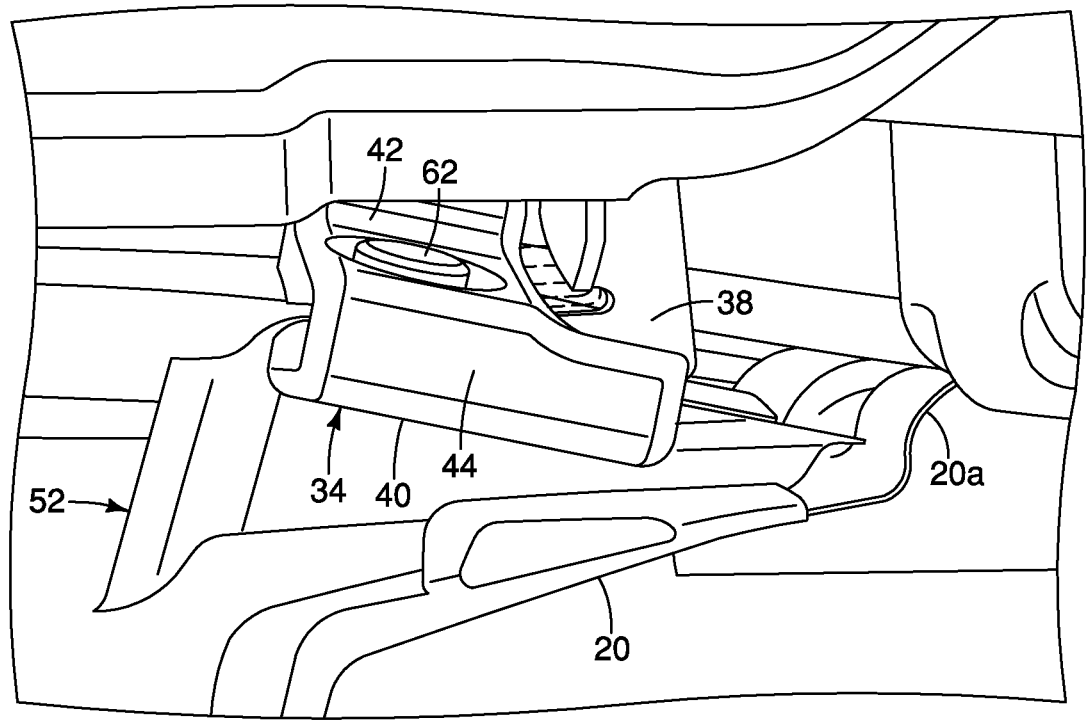
FIG. 8 is a top plan view of the door pad in an interference position with respect to the lock assembly upon an object impacting the outer door panel.

As shown in FIGS. 4-8, the connecting portion 44 of the door pad 34 provides a gap between the outboard and inboard portions 40 and 42. The gap allows the mounting bracket 52 to be received therein, such that the first and third fastener openings 46 and 48 in the outboard and inboard portions 40 and 42 and the second fastener opening 58 in the mounting bracket 52 can be aligned to receive the mounting clip 60. The outboard portion 40 of the door pad 34 contacts an outboard surface 54 of the mounting bracket 52. The inboard portion 42 of the door pad 34 contacts the inboard surface 56 of the mounting bracket 52. As shown in FIGS. 3, 7 and 8, the door pad 34 is disposed between the third stiffener bracket 30 and the lock assembly 32 in a lateral direction of the vehicle.

FIGS. 5-7 illustrate the door pad 34 connected to the third stiffener bracket 20 in which the door panel 10 has not been subject to an impact event such that the door pad 34 does not interfere with operation of the lever 38 of the lock assembly 32. In other words, FIGS. 5-7 show the door pad 34 in a non-interference position with respect to the lever 38. As shown in FIG. 6, the lever 38 is shown in solid lines in the locked position, and with phantom lines for movement of the lever 38 to the unlocked position. As shown in FIG. 6, the lever 38 is shown in solid lines in the unlocked position, and with phantom lines for movement from the unlocked position to the locked position. The recessed surface 50 in the inboard portion 42 of the door pad 34 allows for unobstructed movement of the lever 38 between the unlocked and locked positions.

As shown in FIG. 8, the door pad 34 is configured to interfere with the lock assembly 32 to prevent the lock assembly 32 from unlocking the vehicle door panel 10 upon an object impacting the outer door panel 14 of the vehicle door panel 10. The third stiffener bracket 20 deforms to accommodate forces associated with an object impacting the outer door panel 14. As shown in FIG. 8, the impact forces on the outer door panel 14 cause the third stiffener bracket 20 to move and/or deform in the inboard direction. The inboard movement of the third stiffener bracket 20 results in inboard movement of the mounting bracket 52 connected thereto, which, in turn, results in inboard movement of the door pad 34. An impact to the outer door panel 14 of the vehicle door panel 10 is configured to move the door pad 34 to an interference position that prevents the lever 38 from moving from the locked position to the unlocked position, as shown in FIG. 8. The deformed position of the third stiffener bracket 20 moves the door pad 34 to the interference position shown in FIG. 8, thereby preventing the lever 38 from being able to move to the unlocked position. As shown in FIG. 8, partial movement of the lever 38 can occur, but movement to a position necessary for unlocking the vehicle door panel 10 is prevented.

Second Exemplary Embodiment

Referring now to FIGS. 9 to 17, a door lock assembly 130 in accordance with a second exemplary embodiment of the present invention will now be explained. The door lock assembly 130 is substantially similar to the door lock assembly 30 of the first exemplary embodiment illustrated in FIGS. 2 to 8 except for the differences described below. Similar parts are identified with similar reference numerals, except increased by 100 (i.e., 1xx, accordingly).

Figure 9:
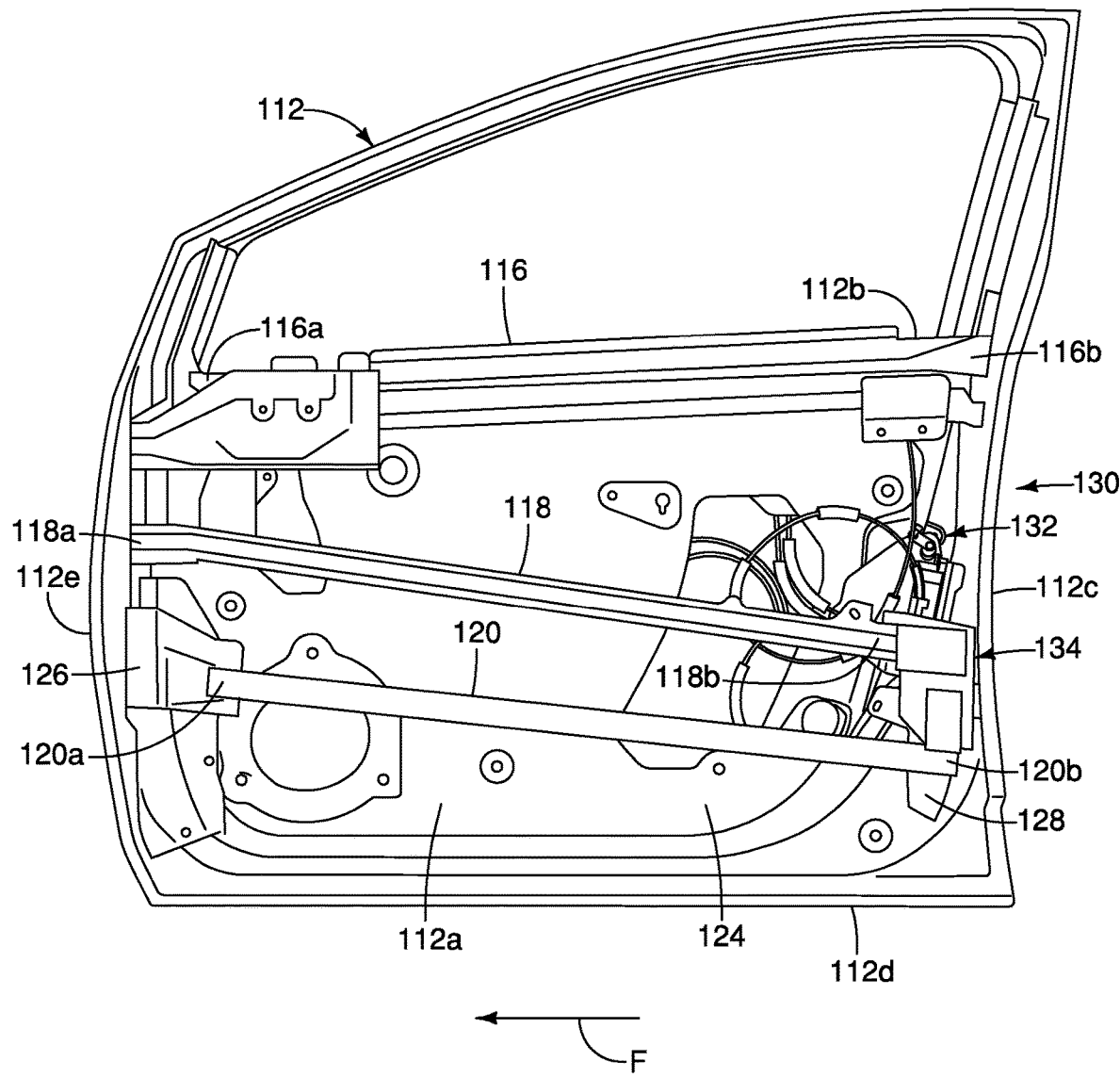
FIG. 9 is a side elevational view of the door panel of FIG. 1 in which an outer door panel is removed in accordance with a second exemplary embodiment of the present invention.

As shown in FIG. 9, an inner door panel, or inner panel, 112 has a plurality of reinforcement, or stiffener, brackets 116, 118 and 120 connected thereto. The plurality of reinforcement members include a first stiffener bracket 116 extending substantially in a longitudinal direction of the vehicle, a second stiffener bracket 118 extending substantially in the longitudinal direction of the vehicle and a third stiffener bracket 120 extending substantially in the longitudinal direction. Each of the first, second and third stiffener brackets 116, 118 and 120 is connected to the inner door panel 112. Preferably, each of the first, second and third stiffener brackets 116, 118 and 120 is made of metal, such as steel, although any suitable material can be used. The inner door panel 112 is shown with three stiffener brackets connected thereto, although any suitable number of stiffener brackets can be used.

Figure 14:
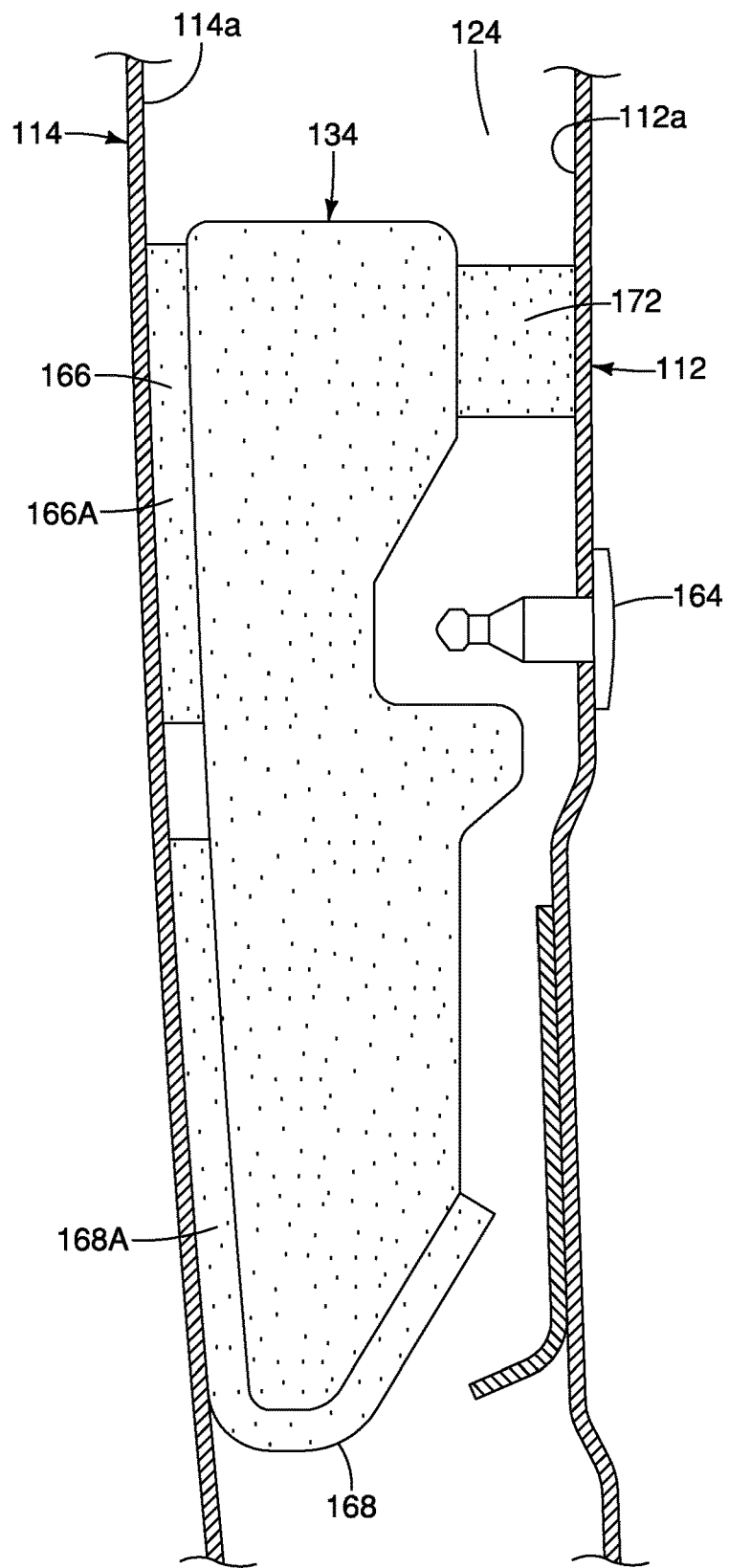
FIG. 14 is an elevational view in cross section of the door pad of FIG. 10.

As shown in FIG. 9, the inner door panel 112 has an outboard surface 112a and an inboard surface (FIG. 14). The inner door panel 112 defines a hollow recessed area or cavity 124 that is concealed with the outer door panel attached to the inner door panel 112 and the vehicle door panel fully assembled. The cavity 124 is defined by the space between the outboard surface 112a of the inner door panel 112 and an inboard surface 114a (FIG. 14) of the outer door panel 114. The inner door panel 112 and the outer door panel 114 are connected to one another in a conventional manner, such as by welding or with an adhesive. For example, an outer periphery of the inner door panel 112 can be fixed to a corresponding outer periphery of the outer door panel 114 via any of a variety of welding techniques or adhesives.

A rearward edge 112c of the inner door panel 112 extends downward from a rear end of an upper edge 112b to a bottom edge 112d, as shown in FIG. 9. The bottom edge 112d is generally straight and extends horizontally (with the vehicle being level) from a lower end of the rearward edge 112c to a lower edge of a forward edge 112e. The forward edge 112e extends upward from a front end of the bottom edge 112d to a forward end of the upper edge 112b.

The first stiffener bracket 116 has a forward, or first, end 116a and a rearward, or second, end 116b, as shown in FIG. 9. The forward and rearward ends 116a and 116b, each of which preferably includes an attachment flange, are rigidly attached to the inner door panel 112 via, for example, one of a variety of conventional welding techniques or mechanical fasteners. The first stiffener bracket 116 is a longitudinally extending bracket within the cavity 124 that extends along the upper edge 112b of the inner door panel 112. The forward end 116a is fixed proximate to the forward edge 112e of the inner door panel 112. The rearward end 116b of the first stiffener bracket 116 is fixed to the inner door panel 112 at a longitudinal position proximate to the rearward edge 112c.

The second stiffener bracket 118 has a forward, or first, end 118a and a rearward, or second, end 118b, as shown in FIG. 9. The forward and rearward ends 118a and 118b of the second stiffener bracket 118, each of which preferably includes an attachment flange, are rigidly connected to the inner door panel 112 via, for example, one of a variety of conventional welding techniques or mechanical fasteners. The second stiffener bracket 118 is an upwardly extending bracket within the cavity 124 that extends upwardly from proximate the rearward edge 112c of the inner door panel 112 to proximate the forward edge 112e of the inner door panel 112. In other words, the second stiffener bracket 118 extends upwardly in a forward direction F of the vehicle, as shown in FIG. 9. The second stiffener bracket 118 is angularly inclined relative to the horizontal. The forward end 118a is fixed proximate to the forward edge 112e of the inner door panel 112. The rearward end 118b of the second stiffener bracket 118 is fixed to the inner door panel 112 at a longitudinal position proximate to the rearward edge 112c. The second stiffener bracket 118 is disposed lower than the first stiffener bracket 116. The second stiffener bracket 118 accommodates forces associated with a side impact on the outer door panel 14 (FIG. 14) of the vehicle door panel 10.

The third stiffener bracket 120 is preferably a tubular member, as shown in FIG. 9. Alternatively, the third stiffener bracket 120 can be a ribbed member similar to the first and second stiffener brackets 116 and 118. A forward, or upper, end 120a of the third stiffener bracket 120 is fixed proximate the forward edge 112e of the inner door panel 112 via an attachment flange 126. A rearward, or lower, end 120b of the third stiffener bracket 120 is fixed to the rearward edge 112c of the inner door panel 112 via an attachment flange 128. The third stiffener bracket 120 is an upwardly extending bracket within the cavity 124 that extends upwardly from proximate the rearward edge 112c of the inner door panel 112 to proximate the forward edge 112e of the inner door panel 112. In other words, the third stiffener bracket 120 extends upwardly in a forward direction F of the vehicle, as shown in FIG. 9. The third stiffener bracket 120 is angularly inclined relative to the horizontal. The third stiffener bracket 120 is disposed lower than the second stiffener bracket 118. The third stiffener bracket 120 preferably has an incline substantially similar to the incline of the second stiffener bracket 118.

A door lock assembly 130 in accordance with the second exemplary embodiment of the present invention is shown in FIGS. 9-17. The door lock assembly 130 includes the door panel 10 (FIG. 1), the second stiffener bracket 118, a lock assembly 132 and a door pad 134.

Figure 10:
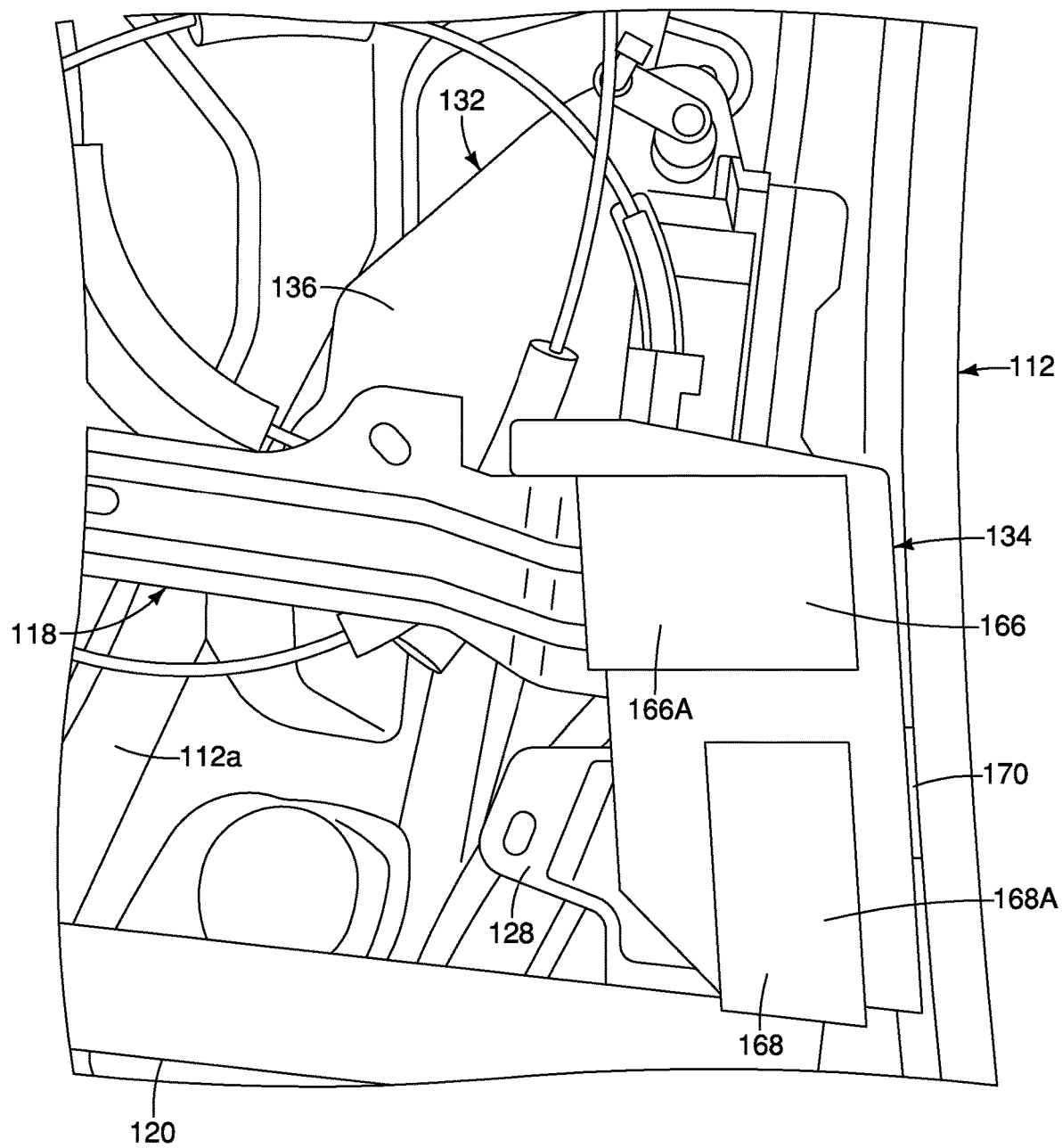
FIG. 10 is an enlarged side elevational view of the inner door panel of FIG. 9 in which a door pad is connected to a stiffening bracket.
Figure 11:
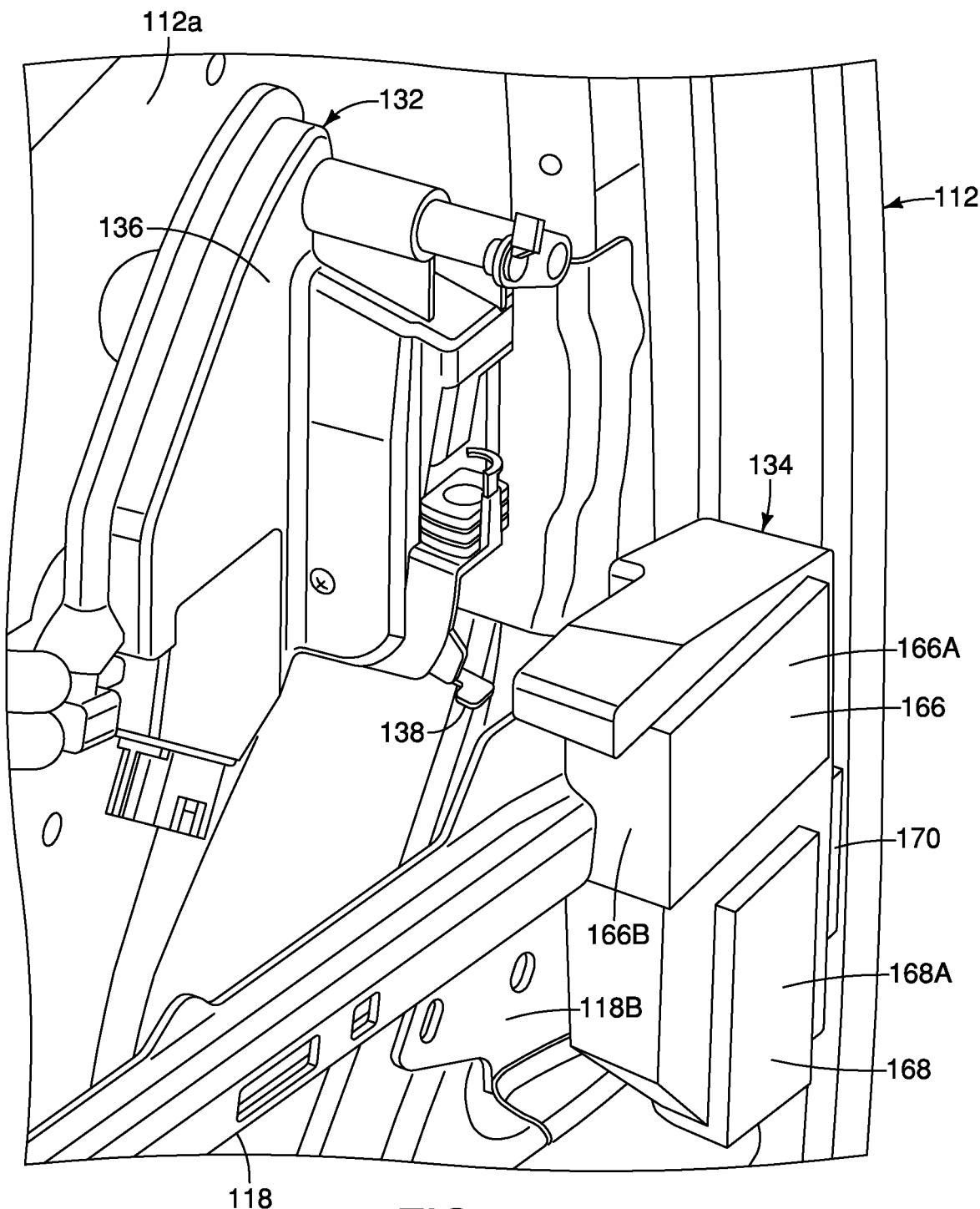
FIG. 11 is an inboard perspective view of the door pad of FIG. 10 in a non-interference position with respect to the lock lever of the lock assembly.

As shown in FIGS. 9-11, the second stiffener bracket 118 is connected to the inner door panel 112. The lock assembly 132 is connected to the inner door panel 112, as shown in FIGS. 10 and 11. An inboard facing portion of the second stiffener bracket 118 contacts the lock assembly 132 to further secure the lock assembly 132 to the inner door panel 112.

Figure 15:
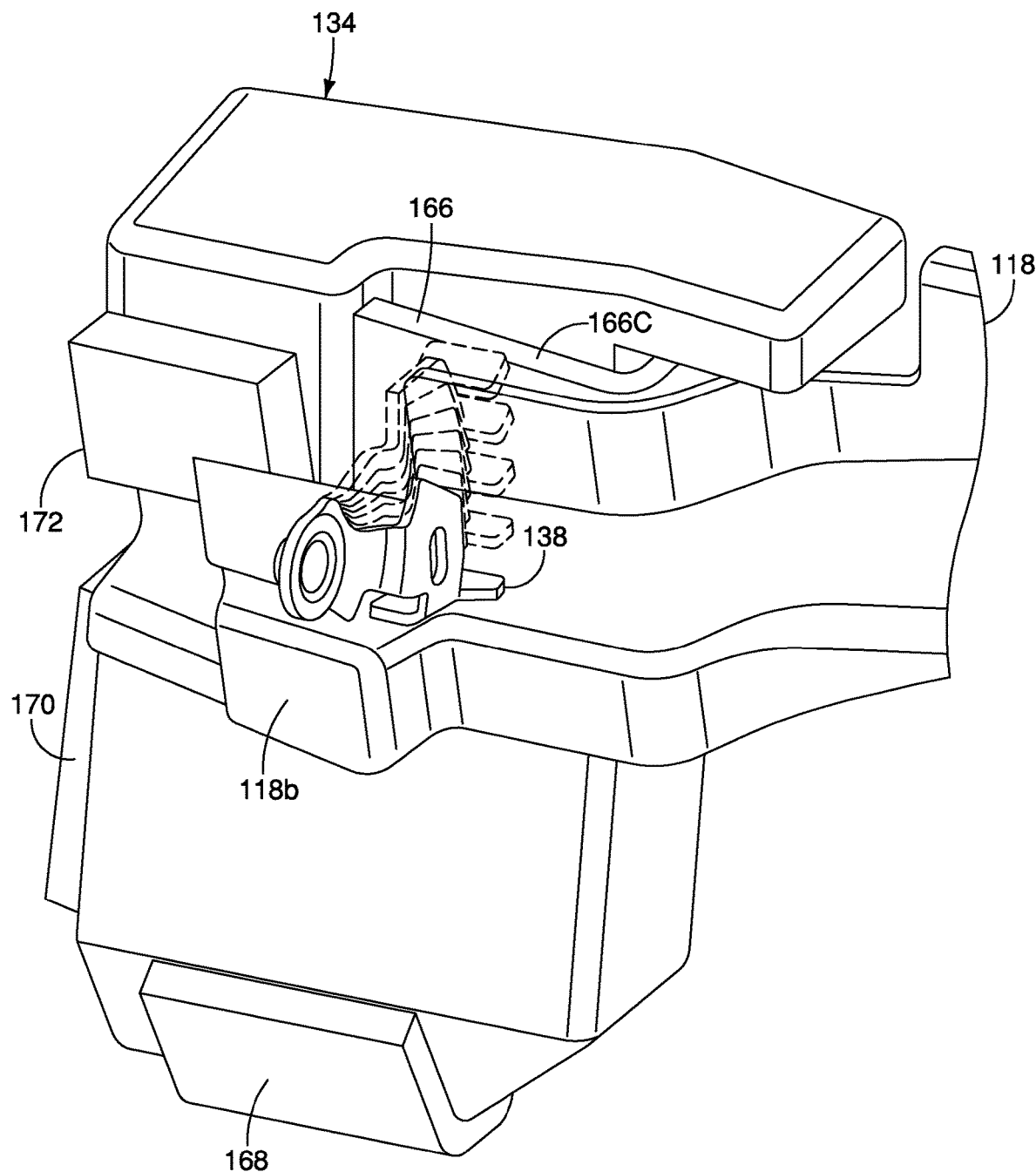
FIG. 15 is a perspective view of the door pad of FIG. 10 in a non-interference position with respect to the lock lever of the lock assembly.

The lock assembly 132 includes a base 136 connected to the inner door panel 112 and a lock lever 138 (FIGS. 11 and 15-17) movable relative to the base 136. Movement of the lever 138 results in movement of a door latch member to engage or disengage a striker connected to a structural pillar of the vehicle. The door latch member and the striker are conventional structures and detailed descriptions thereof are omitted for the sake of brevity. As shown in FIGS. 11 and 15-17, the lever 138 is in a locked position in which the door latch member is engaged with the striker to prevent opening of the vehicle door panel 10 (FIG. 1). Upward movement of the lever 138 results in the door latch member disengaging the striker, such that the vehicle door panel 10 can be opened. A lowermost position of the lever 138 corresponds to the locked position as shown in FIGS. 11 and 15, and an uppermost position of the lever 138 corresponds to the unlocked position as shown in phantom in FIG. 16.

Figure 12:
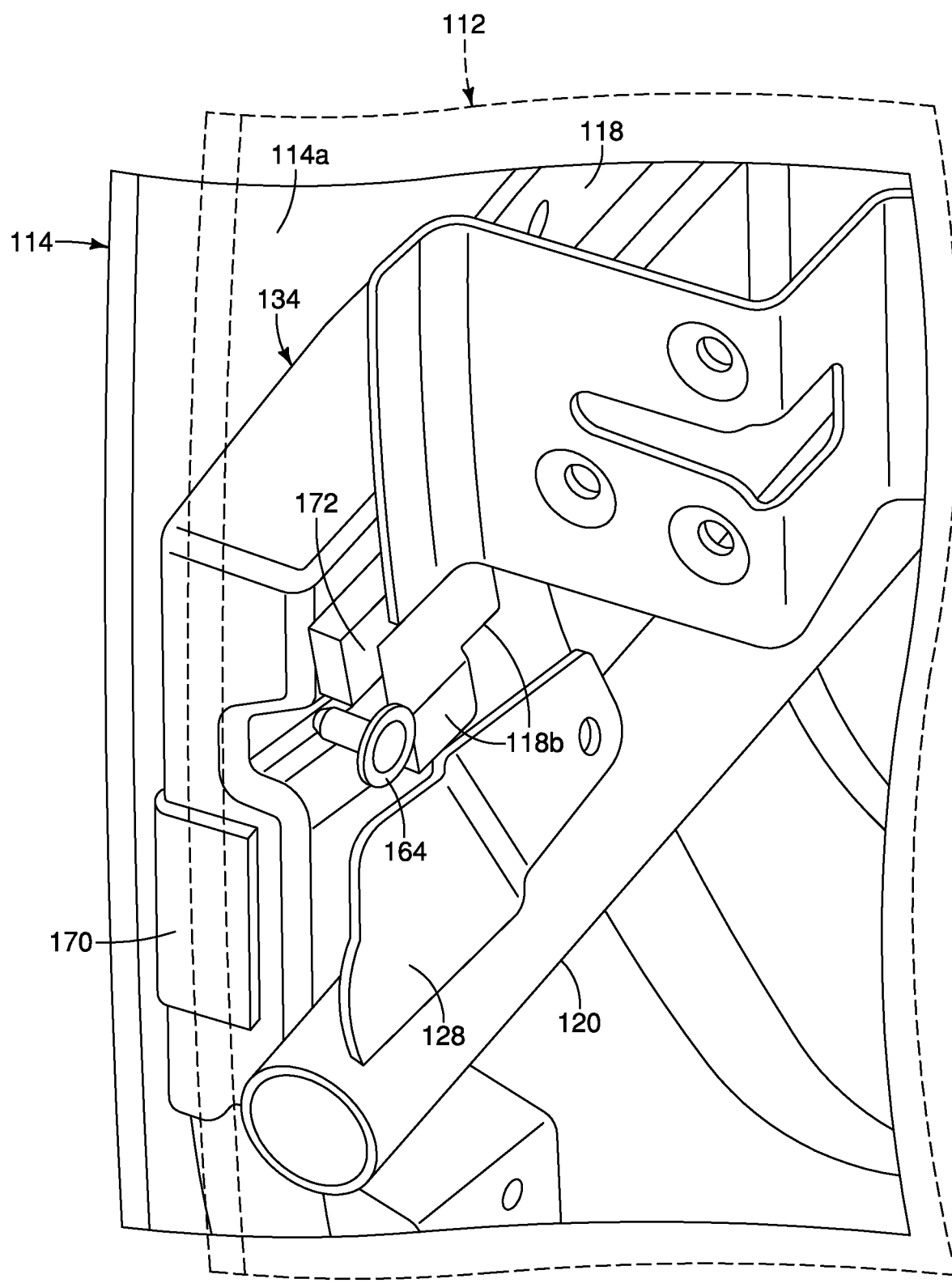
FIG. 12 is an inboard perspective view of the door pad of FIG. 10 in which a retaining clip is received by the inner door panel.
Figure 13:
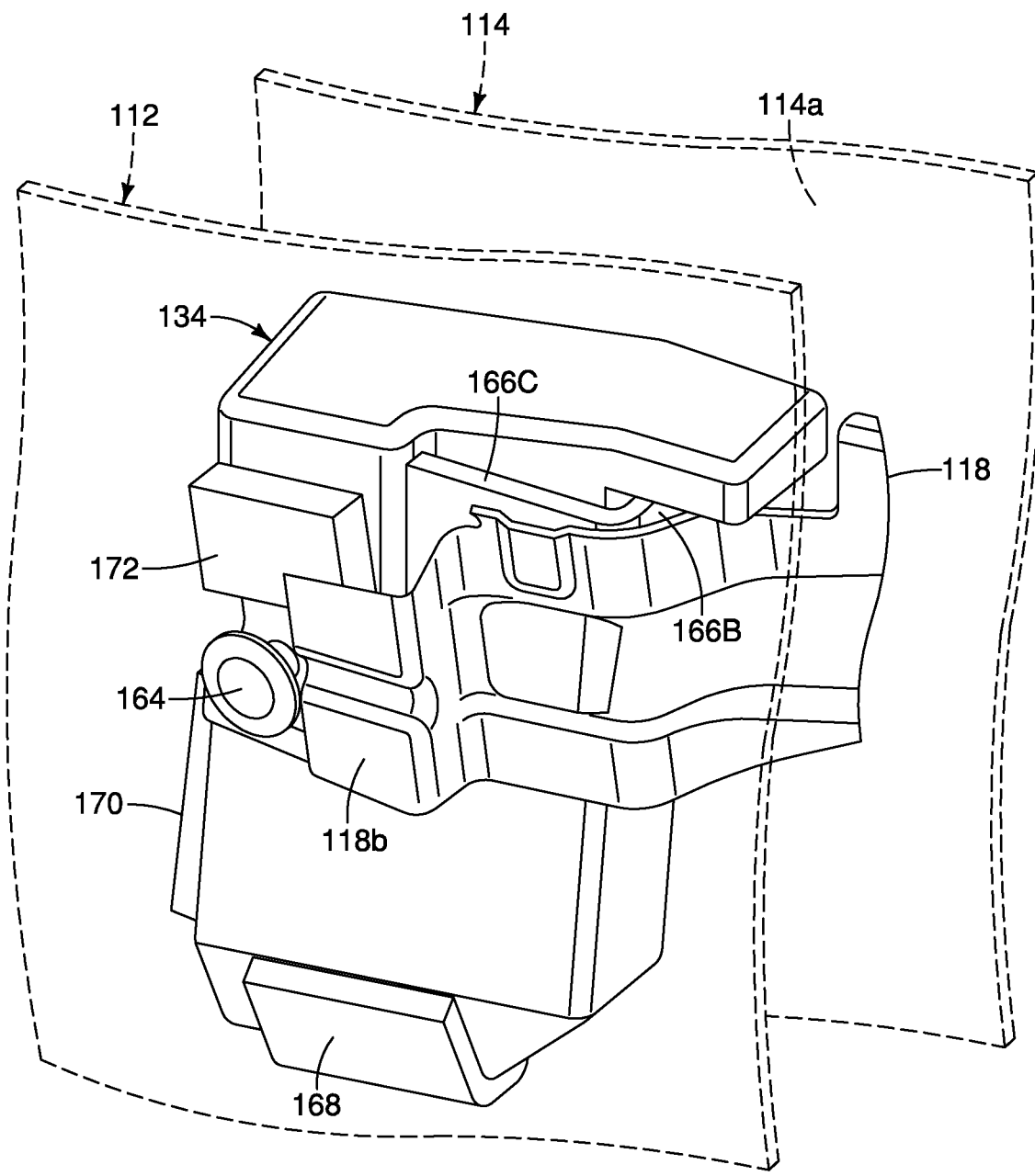
FIG. 13 is an outboard perspective view of the door pad of FIG. 12.

The door pad 134 is connected to the second stiffener bracket 118, as shown in FIGS. 9-14. The door pad 134 is secured between the outer door panel 114, the inner door panel 112 and the second stiffener bracket 118 by an interference fit. Preferably, the door pad 134 is mounted between the outer door panel 114 and the second stiffener bracket 118 without fasteners, as shown in FIGS. 12 and 14. A retaining clip 164 received by the inner door panel 112 extends into the cavity 124 between the inner and outer door panels 112 and 114, as shown in FIGS. 12-14. The retaining clip 164 substantially prevents movement of the door pad 134 in the inboard direction. In other words, the retaining clip 164 prevents movement of the door pad 134 from the interference fit between the inner and outer door panels 112 and 114 and the second stiffener bracket 118. The door pad 134 is preferably a unitary, one-piece member. Preferably, the door pad 134 is made of an expanded polypropylene (EPP) foam, although any suitable material can be used.

A plurality of noise reducing pads 166, 168, 170 and 172 are connected to the door pad 134 to reduce sounds associated with movement of the door pad 134, as shown in FIGS. 10-15. Each noise reducing pad is preferably made of ethylene propylene terpolymer (EPT) foam. Each of the noise reducing pads can be connected to the door pad 134 in any suitable manner, such as by an adhesive or by an interference fit between the door pad and adjacent structure. Preferably, each noise reducing pad is preferably unitarily formed as a one-piece member.

A first noise reducing pad 166 is substantially U-shaped, as shown in FIGS. 11, 13 and 14. A first portion 166a of the first noise reducing pad 166 is disposed between the door pad 134 and the inboard facing surface 114a of the outer door panel 114. Second and third portions 166B and 166C of the first noise reducing pad 166 are disposed between the door pad 134 and an end of the second stiffener bracket 118.

A second noise reducing pad 168 is substantially J-shaped, as shown in FIGS. 10, 11, 13 and 14, although the second noise reducing pad can have any suitable shape. A first portion 168A of the second noise reducing pad 168 is disposed between the door pad 134 and the inboard surface 114a of the outer door panel 114.

A third noise reducing pad 170 is substantially rectangular, as shown in FIGS. 10-13, although the third noise reducing pad 170 can have any suitable shape. The third noise reducing pad 170 is disposed between the door pad 134 and the outboard facing surface 112a of the inner door panel 112.

A fourth noise reducing pad 172 is substantially rectangular, as shown in FIGS. 12, 13 and 15, although the fourth noise reducing pad 172 can have any suitable shape. The fourth noise reducing pad 172 is disposed between the door pad 134 and the outboard surface 112a of the second stiffener bracket 118.

Figure 16:
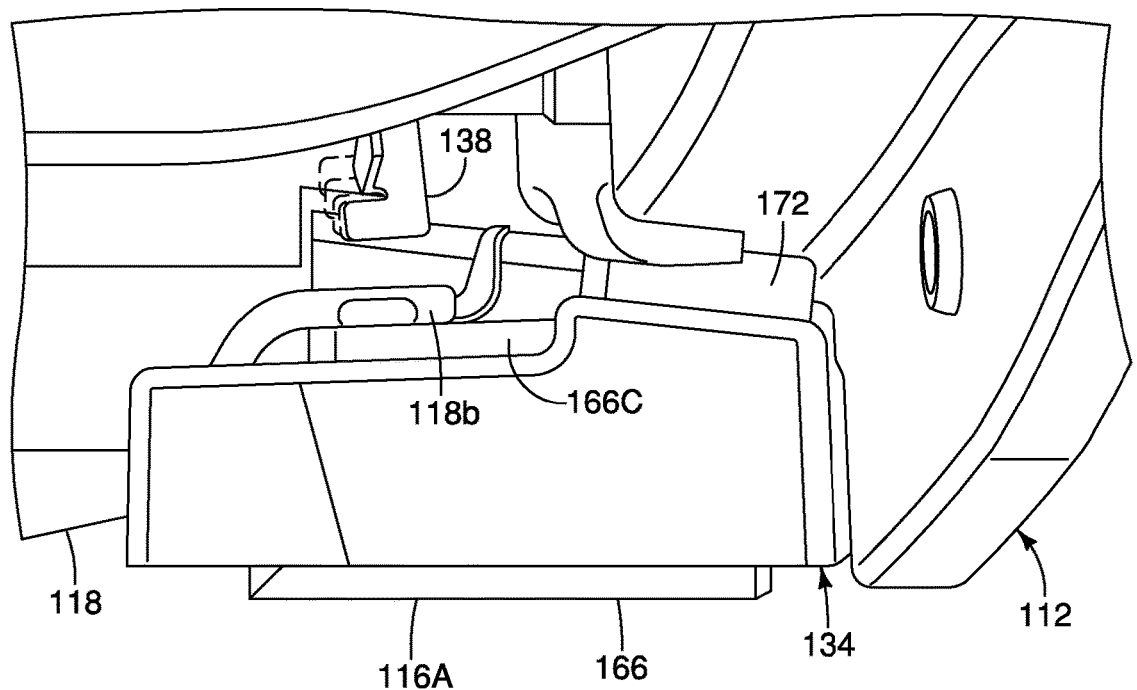
FIG. 16 is a top plan view of the door pad of FIG. 10 in a non-interference position with respect to the lock lever of the lock assembly.

FIGS. 11, 15 and 16 illustrate the door pad 134 connected to the second stiffener bracket 118 in which the door panel 10 (FIG. 1) has not been subject to an impact event such that the door pad 134 does not interfere with operation of the lever 138 of the lock assembly 132. As shown in FIGS. 11 and 15, the lever 138 is shown in solid lines in the locked position. In FIG. 15, movement of the lever 138 to the unlocked position is shown in phantom lines. As shown in FIG. 16, the lever 138 is shown in solid lines in the unlocked position, and in phantom lines for movement of the lever 138 to the unlocked position. The door pad 134 and the second stiffener bracket 118 are spaced from the lever 138 prior to an object impacting the vehicle door panel 10 (FIG. 1), as shown in FIGS. 15 and 16. In other words, the door pad 134 and the second stiffener bracket 118 do not interfere with operation of the lever 138 between the unlocked and locked positions during normal operating conditions. The second stiffener bracket 118 is disposed between the door pad 134 and the lock assembly 132 in a lateral direction of the vehicle, as shown in FIGS. 10 and 16. The door pad 134 is disposed between the outer door panel 114 and the second stiffener bracket 118, as shown in FIG. 12, in a lateral direction of the vehicle.

Figure 17:
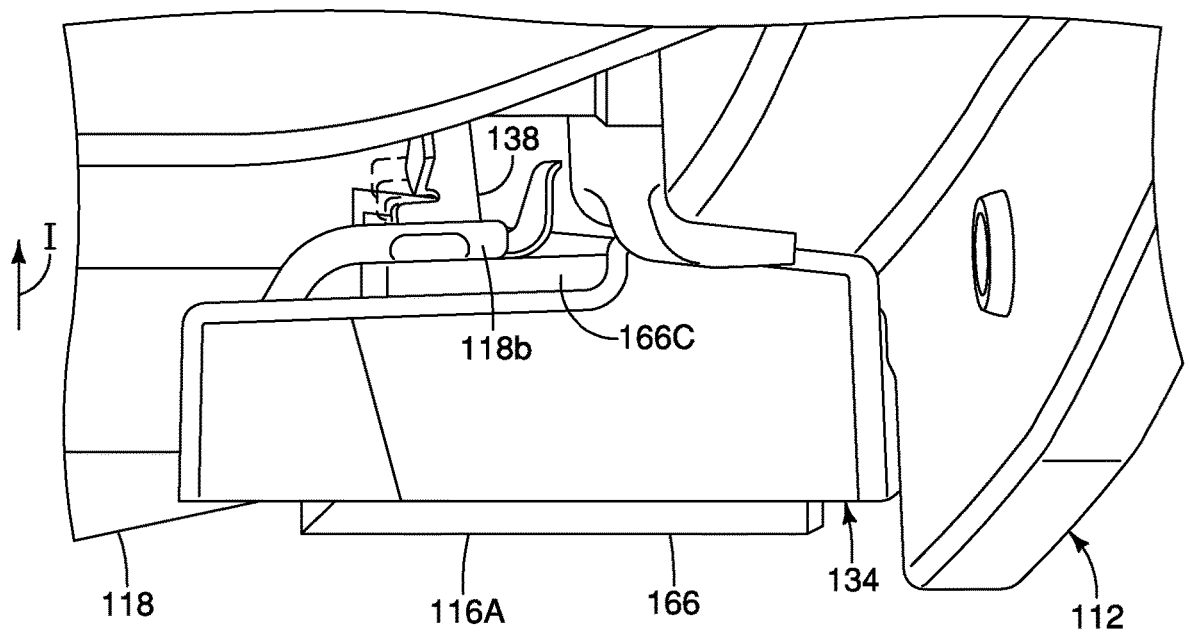
FIG. 17 is a top plan view of the door pad of FIG. 10 in an interference position with respect to the lock lever of the lock assembly.
Figure 18:
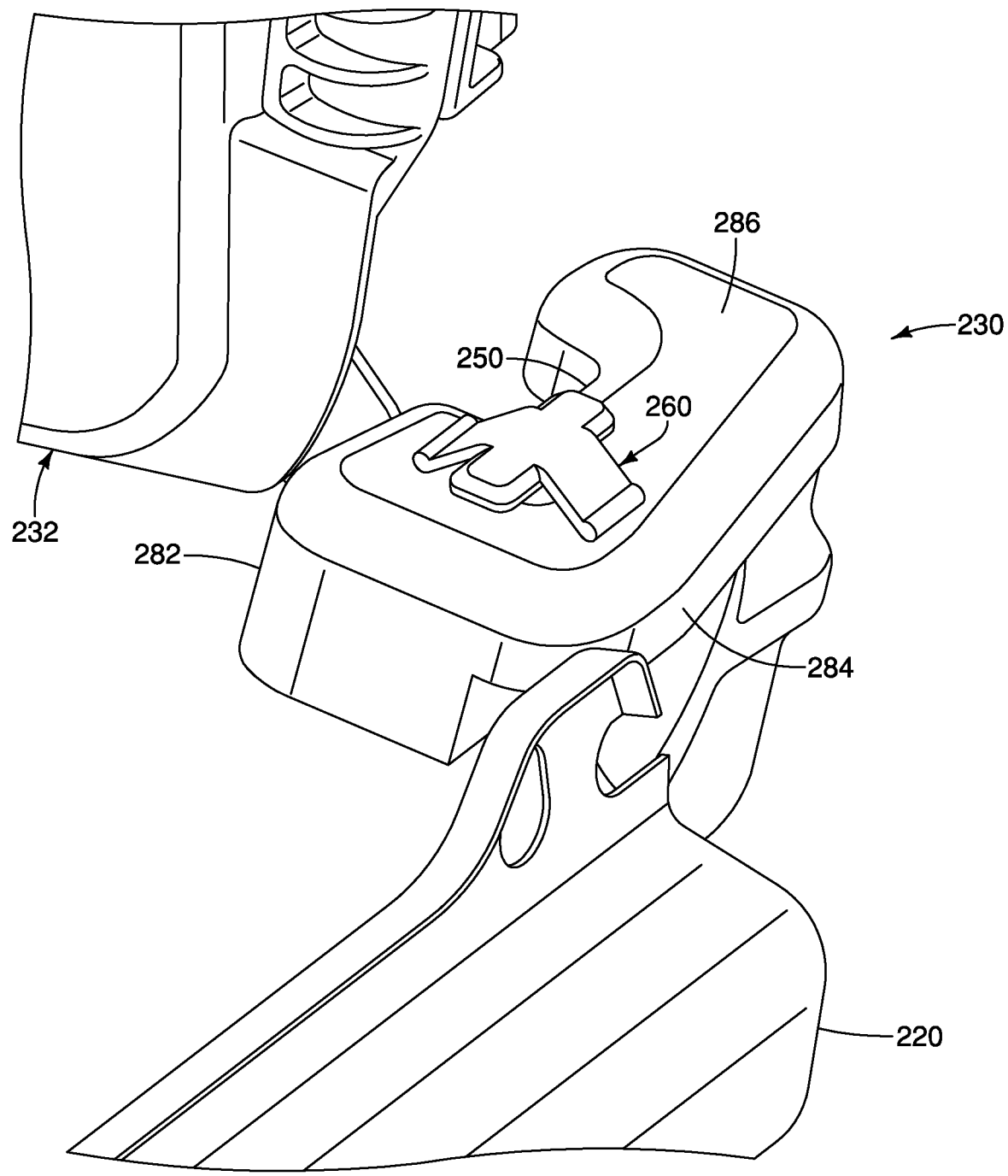
FIG. 18 is an inboard perspective view of a door pad in a non-interference position with respect to a lock lever of a lock assembly in accordance with a third exemplary embodiment of the present invention.

As shown in FIG. 17, the door pad 134 is configured to interfere with operation of the lock assembly 132 to prevent the lock assembly 132 from unlocking the vehicle door panel 10 (FIG. 1) upon an object impacting the outer door panel 114 of the vehicle door panel 10. An object impacting the outer door panel 114 causes deformation of the outer door panel 114, to which the door pad 134 is connected. Inboard movement of the outer door panel 114, results in movement in the inboard direction I of the door pad 134. The second stiffener bracket 118 deforms to accommodate forces associated with an object impacting the outer door panel 114. As shown in FIG. 17, the impact forces on the outer door panel 114 cause the second stiffener bracket 118 to move and/or deform in the inboard direction. The inboard movement of the door pad 134 moves the deformed second stiffener bracket 118 to an interference position that prevents the lever 138 from moving from the locked position to the unlocked position, as shown in FIG. 17. Partial movement of the lever 138 can occur, but movement to a position necessary for unlocking the vehicle door panel 10 is prevented by the second stiffener bracket 118.

Third Exemplary Embodiment

Referring now to FIGS. 18-22, a door lock assembly 230 in accordance with a third exemplary embodiment of the present invention will now be explained. The door lock assembly 230 is substantially similar to the door lock assembly 30 of the first exemplary embodiment illustrated in FIGS. 2 to 8 except for the differences described below. Similar parts are identified with similar reference numerals, except increased by 200 (i.e., 2xx, accordingly).

The door lock assembly 230 includes the door panel, a stiffener bracket 220, a lock assembly 232 and a door pad 234.

Figure 19:
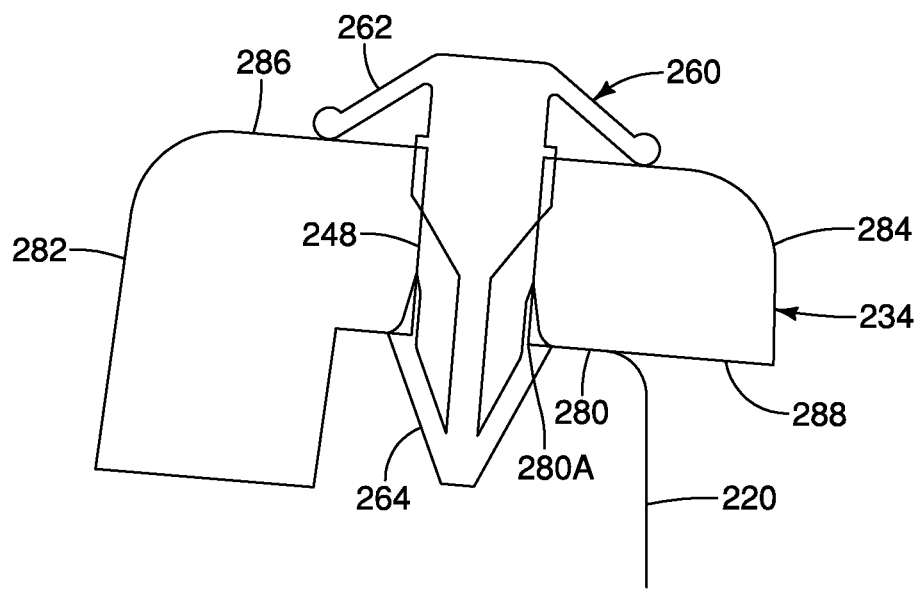
FIG. 19 is a side elevational view of the door pad of FIG. 18.

The stiffener bracket 220 is substantially similar to the third stiffener bracket 20 and is connected to the inner door panel. The stiffener bracket 220 includes a mounting tab 280, as shown in FIG. 19, which extends in an inboard direction of the vehicle. A fastener opening 280A is disposed in the mounting tab 280.

The door pad 234 is connected to the stiffener bracket 220, as shown in FIGS. 18-22. The door pad 234 is preferably a unitary, one-piece member. Preferably, the door pad 34 is made of an expanded polypropylene (EPP) foam, although any suitable material can be used.

Figure 20:
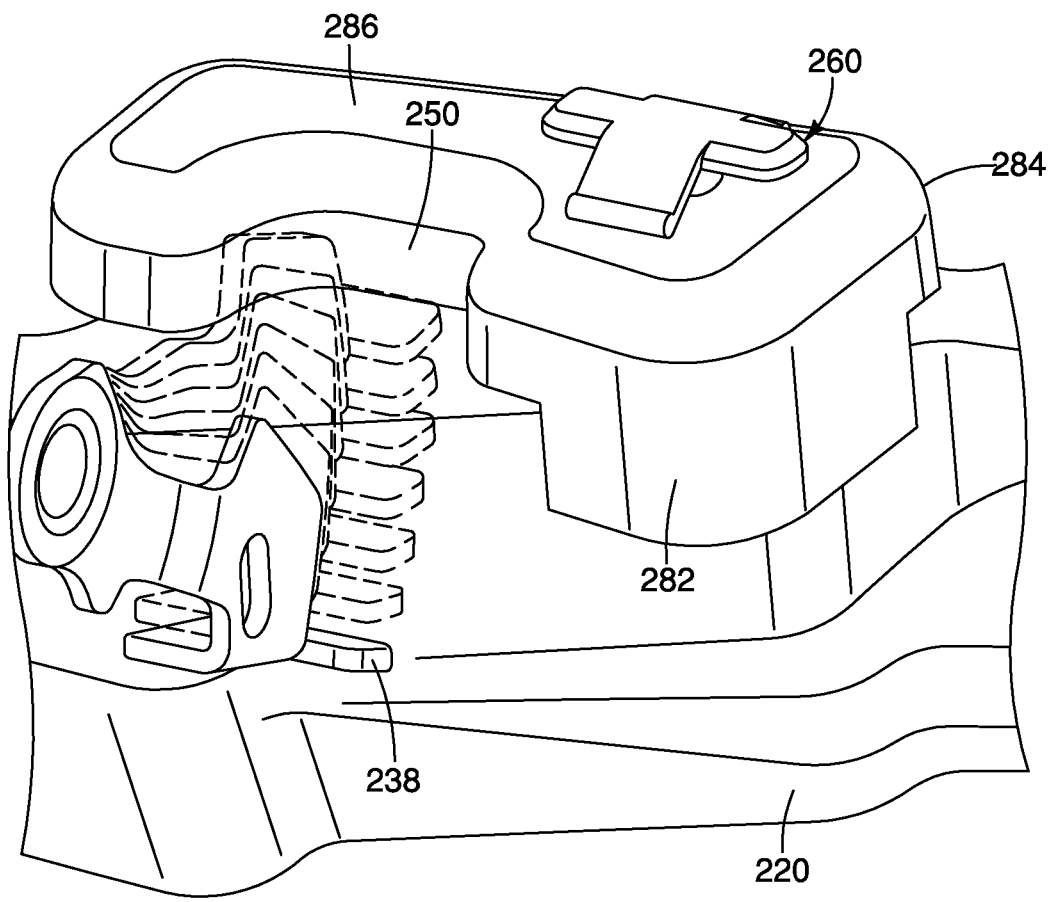
FIG. 20 is an outboard perspective view of the door pad of FIG. 18 in a non-interference position with respect to the lock lever of the lock assembly.
Figure 21:
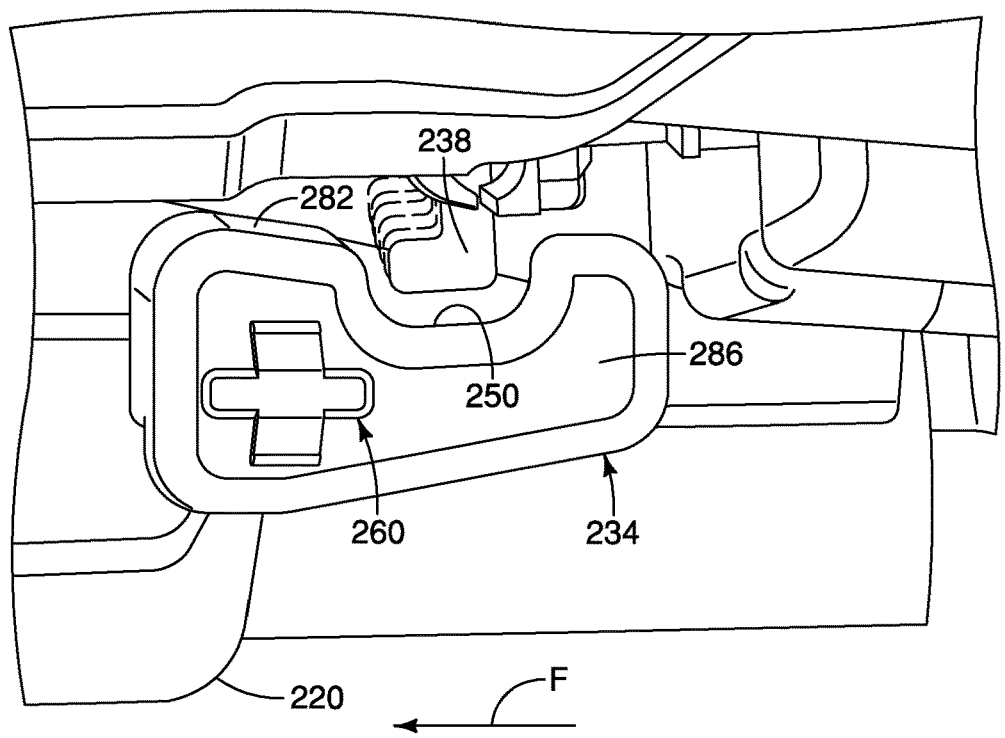
FIG. 21 is a top plan view of the door pad of FIG. 20 in the non-interference position.

As shown in FIGS. 18-22, the door pad 234 has an inboard facing surface 282 and an outboard facing surface 284. The inboard facing surface 282 of the door pad 234 has a recessed surface 250 to allow movement of the lever 238 between the locked and unlocked positions, as shown in FIGS. 20 and 21. The width of the recessed surface is preferably less than an entire width of the inboard facing surface 282.

A fastener opening 248 is disposed in the door pad 234, as shown in FIG. 19. The fastener opening 248 extends from an upper surface 286 to a lower surface 288 of the door pad 234. The fastener opening 248 is spaced from the recessed surface 250 to avoid interfering with movement of the lever 238, as shown in FIGS. 20 and 21. The fastener opening 248 is disposed forward of the recessed surface 250 in a vehicle forward direction F, as shown in FIG. 21.

A mounting clip 260 secures the door pad 234 to the stiffener bracket 220, as shown in FIGS. 18-22. The mounting clip 260 has a head 262 disposed at one end and a retaining clip 264 disposed at an opposite end thereof. The mounting clip 260 is passed through the fastener opening 248 in the door pad 234, and through the fastener opening 280A in the stiffener bracket 220, as shown in FIG. 19, to secure the door pad 234 to the stiffener bracket 220.

The retaining clip 264 is preferably a pair of flexible arms that flex inwardly to pass through the plurality of fastener openings 248 and 280A, and then flex outwardly to prevent removal of the inserted mounting clip 260. As shown in FIG. 19, the mounting clip 260 is inserted in a downward direction, although the mounting clip can be installed in the upward direction. The width of the head 262 of the mounting clip 260 is larger than a diameter of the fastener opening 248 to limit the insertion depth of the mounting clip 260. The width of the retaining clip 264 is larger than a diameter of the fastener opening 280A in the stiffener bracket 220 to prevent removal of the inserted mounting clip 260.

FIGS. 18-21 illustrate the door pad 234 connected to the stiffener bracket 220 in which the door panel (FIG. 1) has not been subject to an impact event such that the door pad 234 does not interfere with operation of the lever 238 of the lock assembly 232. In other words, FIGS. 18-21 show the door pad 234 in a non-interference position with respect to the lever 238. As shown in FIG. 20, the lever 238 is shown in solid lines in the locked position, and with phantom lines for movement of the lever 238 to the unlocked position. As shown in FIG. 21, the lever 238 is shown in solid lines in the unlocked position, and with phantom lines for movement of the lever 238 from the locked position to the unlocked position. The recessed surface 250 in the inboard facing surface 282 of the door pad 234 allows for unobstructed movement of the lever 238 between the unlocked and locked positions.

Figure 22:
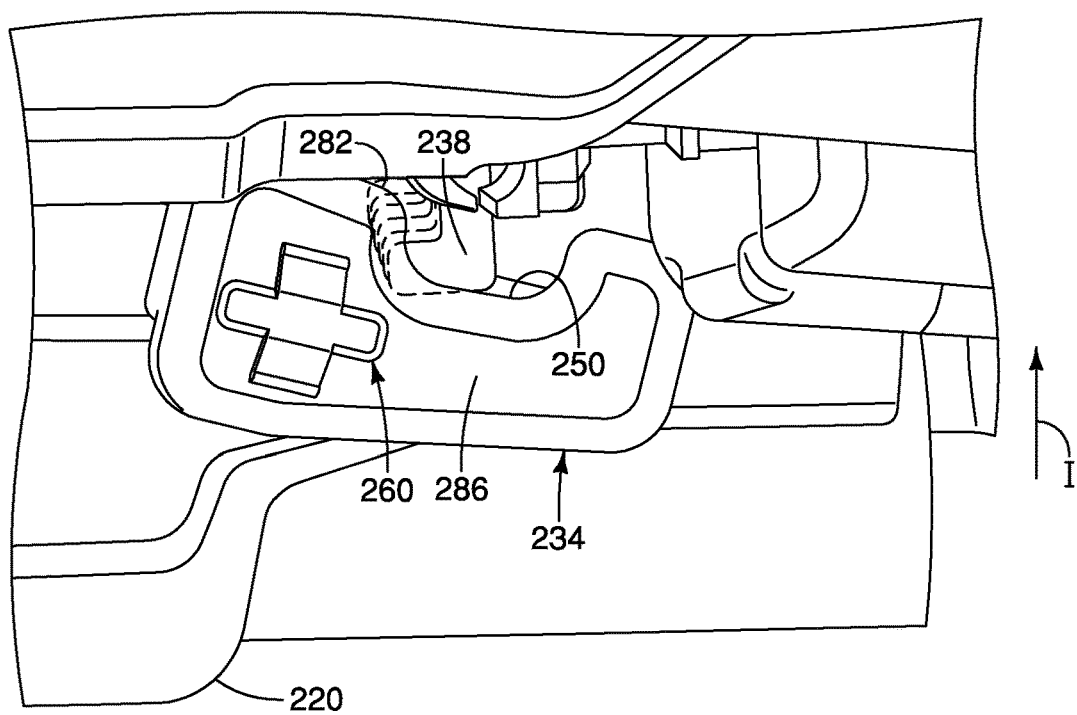
FIG. 22 is a top plan view of the door pad of FIG. 18 in an interference position with respect to the lock assembly upon an object impacting the outer door panel.

As shown in FIG. 22, the door pad 234 is configured to interfere with the lock assembly 232 to prevent the lock assembly 232 from unlocking the vehicle door panel (FIG. 1) upon an object impacting the outer door panel (FIG. 1) of the vehicle door panel. The stiffener bracket 220 deforms to accommodate forces associated with an object impacting the outer door panel. As shown in FIG. 22, the impact forces on the outer door panel cause the stiffener bracket 220 to move and/or deform in the inboard direction I of the vehicle. The inboard movement of the stiffener bracket 220 results in inboard movement of the door pad 234. An impact to the outer door panel 214 of the vehicle door panel is configured to move the door pad 234 to an interference position that prevents the lever 238 from moving from the locked position to the unlocked position, as shown in FIG. 22. The deformed position of the stiffener bracket 220 moves the door pad 234 to the interference position shown in FIG. 22, thereby preventing the lever 238 from being able to move to the unlocked position. As shown in FIG. 22, partial movement of the lever 238 can occur, but movement to a position necessary for unlocking the vehicle door panel is prevented.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the title. Accordingly, these terms, as utilized to describe the present invention should be interpreted relative to a vehicle equipped with the title.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A door lock assembly for a vehicle door comprising:
    a door panel including an inner door panel and an outer door panel;
    a stiffener bracket connected to the inner door panel;
    a lock assembly connected to the inner door panel;
    a door pad connected to the stiffener bracket, the door pad being configured to interfere with the lock assembly to prevent the lock assembly from unlocking the vehicle door upon an object impacting the outer door panel;
    a mounting bracket connected to the stiffener bracket, the door pad being connected to the mounting bracket; and
    a mounting clip received by a first fastener opening and a third fastener opening disposed in the door pad and a second fastener opening disposed in the mounting bracket;
    the door pad having a first portion contacting a first surface of the mounting bracket and a second portion contacting a second surface of the mounting bracket.

2. The door lock assembly according to claim 1, wherein the lock assembly includes a lever movable between a locked position and an unlocked position, an impact to the outer panel of the vehicle door being configured to move the door pad to an interference position that prevents the lever from moving from the locked position to the unlocked position.

3. The door lock assembly according to claim 1, wherein the first fastener opening is disposed in the first portion of the door pad and the third fastener opening is disposed in the second portion of the door pad.

4. The door lock assembly according to claim 1, wherein the second portion of the door pad has a recessed surface to allow movement of the lever between the unlocked and locked positions.

5. The door lock assembly according to claim 1, wherein the door pad is disposed between the stiffener bracket and the lock assembly in a lateral direction of the vehicle.

6. The door lock assembly according to claim 1, wherein the door pad is a unitary, one-piece member.

7. The door lock assembly according to claim 1, wherein the door pad is made of an expanded polypropylene foam.

8. A door lock assembly for a vehicle door comprising:
a door panel including an inner door panel and an outer door panel;
a stiffener bracket connected to the inner door panel;
a lock assembly connected to the inner door panel; and
a door pad connected to the stiffener bracket, the door pad being configured to interfere with the lock assembly to prevent the lock assembly from unlocking the vehicle door upon an object impacting the outer door panel, the door pad being disposed between the outer door panel and the stiffener bracket in a vehicle lateral direction,
the lock assembly including a lever movable between a locked position and an unlocked position, an impact to the outer panel of the vehicle door being configured to move the door pad to a position that moves the stiffener bracket to an interference position that prevents the lever from moving from the locked position to the unlocked position.

9. The door lock assembly according to claim 8, wherein the door pad is mounted between the outer door panel and the stiffener bracket without fasteners.

10. The door lock assembly according to claim 9, wherein a retaining clip disposed in the inner door panel substantially prevents movement of the door pad in the inboard direction.

11. The door lock assembly according to claim 8, wherein at least one noise reducing pad is connected to the door pad.

12. The door lock assembly according to claim 11, wherein
the at least one noise reducing pad is made of an ethylene propylene terpolymer foam.

13. The door lock assembly according to claim 8, wherein the stiffener bracket is disposed between the door pad and the lock assembly in a vehicle lateral direction.

14. The door lock assembly according to claim 8, wherein the door pad is made of an expanded polypropylene foam.

15. The door lock assembly according to claim 8, wherein the door pad is a unitary, one-piece member.

\* \* \* \* \*